US006597313B2

(12) United States Patent
Ainbinder

(10) Patent No.: US 6,597,313 B2
(45) Date of Patent: Jul. 22, 2003

(54) SYSTEM FOR GLOBAL AUTOMATIC CONTROL OF TRANSPORTATION MEANS DURING NORMAL AND EXTREME SITUATIONS

(76) Inventor: Joseph Mironovich Ainbinder, 14, Bolshaya Kommunisticheskaya str., Apt. 9, 109004, Moscow (RU)

( * ) Notice: Subject to any disclaimer, the term of this patent is extended or adjusted under 35 U.S.C. 154(b) by 0 days.

(21) Appl. No.: 09/979,147

(22) PCT Filed: Feb. 7, 2001

(86) PCT No.: PCT/RU01/00048

§ 371 (c)(1),
(2), (4) Date: Nov. 20, 2001

(87) PCT Pub. No.: WO01/71373

PCT Pub. Date: Sep. 27, 2001

(65) Prior Publication Data

US 2002/0158802 A1 Oct. 31, 2002

(30) Foreign Application Priority Data

Mar. 23, 2000 (RU) ....................................... 2000107090

(51) Int. Cl.[7] ................................................ G01S 1/00
(52) U.S. Cl. ....................................... 342/385; 342/386
(58) Field of Search ................................ 342/173, 352, 342/353, 367, 385, 386

(56) References Cited

U.S. PATENT DOCUMENTS 6,160,994 A * 12/2000 Wiedeman ................. 455/12.1
6,377,981 B1 * 4/2002 Ollikainen et al. ......... 709/217

* cited by examiner

*Primary Examiner*—Dao Phan
(74) *Attorney, Agent, or Firm*—Sughrue Mion, PLLC

(57) ABSTRACT

The invention relates to control systems and is directed at defining the state of transportation means (TM) in normal and extreme conditions. Each TM is fitted with a power-on radio beacon station (RB) whose signals are retransmitted by means of geostationary Artificial Earth Satellites (AES) of the integrated variety to mated ground stations for reception of information. In extreme situations of TM, the transmission of information from RB is carried out continuously by signal sets with a gap of up to 1 within the narrow band in a wave-range of 400 $MH_z$ which is provided for transmitting emergency signals with the aid of AES. In the normal conditions, signal transmission is carried out in a narrow adjacent band with intervals between sets of greater than 10 sec. An 20–30-fold increase of a transfer bandwidth of the system is ensured by means of a synchronous transmission of the information sets from RB one after another with small time gaps. Synchronism is obtained by means of accurate time marks emitted by RB receivers from navigation systems of the earth satellites of GPS and/or GLONASS.

5 Claims, 2 Drawing Sheets

MONITORING MODE SIGNALS

SYSTEM FOR GLOBAL AUTOMATIC CONTROL OF TRANSPORTATION MEANS DURING NORMAL AND EXTREME SITUATIONS

BACKGROUND OF THE INVENTION

The invention relates to tracking transport vehicles (TV) with the help of radio means, and, more particular, to usage of satellite systems for increasing safety of traffic of the TV by providing the regular automatic monitoring, in real time mode, of precise values of current coordinates of the TV in air, on land and at sea, at standard (normal) conditions of operation ("Monitoring " mode) and immediate warning about the precise values of coordinates of sites where extreme situations (emergencies, catastrophes, hijackings etc.) occur ("Emergency" mode ). At present, each of these two problems ("Monitoring" and "Emergency") is dealt with separately within the framework of two independent satellite systems, each of which contains independent complex of equipment of its own, including both the basic equipment (satellites, land data collecting centers—DCC) and sets of many tens of thousand units of on-board equipment (Emergency Position Indicating Radio Beacons—EPIRB), placed on board air, marine, river and land TV.

International System COSPAS-SARSAT is the only operational specialized independent satellite system for searching the sites of emergencies therefore it was chosen as the prototype for the solution of one aspect of the comprehensive problem. This system provides for the TV to be equipped with EPIRB. Upon manual or automatic activation, these EPIRB radiate, on the specially assigned "space emergency frequency" 406.025 MHz, the distress calls. Six low orbit earth satellites (LO ES) are used for retransmission of these signals to land DCC (see "Mobile Satellite Communications", L. M. Nevdyaev, Moscow, MCTI, 1998, pp. 41–44)[1].

However, the latency period of a LO ES occurrence in a zone of a disaster can exceed 1.5 hours. The position of a signaling EPIRB (with accuracy up to 3,000 m) is evaluated by the LO ES onboard processor due to the "Doppler shift" of frequency, which process adds up to 10–15 minutes to the initial delay. Such time consuming search (in principle, bearable in sea or land disasters) basically eliminates possibility of using of this system for searching sites of instant (5–50 sec) air-crashes.

The following attempts to overcome this problem, within the framework of the above system, by preserving the EPIRB intact after destruction of an aircraft have failed:

- ejection of EPIRB before a catastrophe takes place, and its soft touchdown by a parachute. The drawbacks: the accuracy and reliability of a precise location of the catastrophe site are drastically reduced, and the cost of EPIRB is considerably increased;
- fixation of an extremely durable EPIRB on the outer surface of an aircraft body (i. e. the EPIRB capable to survive the aircraft impact with the ground).

This approach had no success either.

The second important aspect of this comprehensive problem—"Monitoring"—is partially solved (for aircraft) by a network of tracking radars, which construction and operation are rather expensive, and also by a network of the ground relay radio stations and rented radio channels of a marine satellite system a INMARSAT covering oceans (see [1], page 69). This solution, for the lack of any better one, was used as the prototype for the solution of the second aspect of the comprehensive problem. To the drawbacks of this prototype one should attribute the considerable costs of construction and operation of a ramified terrestrial network of relay radio stations and high fares for use of radio channels of INMARSAT, which makes this solution compatible, complexity- and cost-wise, with the system of tracking radars. Besides, the INMARSAT geostationary satellites (GS ES), located on a latitude of equator, do not provide the steady connection with air and sea vehicles traveling in a sub-polar zone (there is no direct vision line, and the effect of radio wave "curving" the Earth, on the operational frequency of this system—1,500 MHz,—is not yet pronounced.

SUMMARY OF THE INVENTION

The claimed invention is aimed at the integrated solution of the problem of automatic monitoring of a TV en route (TV tracing) and detection of a TV catastrophe site. The proposed solution can be applied to all kinds of TV, however, since the problem is especially critical in the field of aircraft, this application will consider the practical solution in respect of aircraft.

To deal with the short-lasting (nearly instant) air accidents (catastrophes) the invention offers a new approach eliminating the need to overcome the practically insoluble (by known means) problem of the EPIRB preservation after the aircraft destruction. The invention provides for saving not the EPIRB per se, but for saving the data on precise position of a aircraft fall site, which data the EPIRB will timely transmit before the aircraft destruction.

The invention provides for the development of a satellite system capable of instantaneous action, the response time of which (up to 0.5 sec) is tenfold less than the duration of even most short-lasting (5 sec.) air catastrophes. In such system EPIRB, within few seconds prior to the aircraft destruction but while it is still in air, will manage to transmit, repeatedly and in real time mode, to the air traffic control centers (ATCC), the reliable data on precise values of present coordinates of the aircraft falling trace, up to the moment of the termination of transmission, that is up to the moment of the aircraft destruction.

It is evident, that for implementation of the system of instantaneous response one will have to use the "fixed" GS ES which are always ready to prompt retransmission of the emergency information from EPIRB to DCC. The invention provides for the use of five GS ES and the EPIRB linked with them, i.e. the elements constructed and put into the experimental operation in the course of the first modernization of the COSPAS-SARSAT System.

The instantaneous "action" of the on board EPIRB of a new type, is achieved due to incorporation of the following components operating during the flight period:

- radio-receiver of signals transmitted by the satellite navigation systems GPS/GLONASS, ensuring instant recording of current values of an aircraft coordinates (latitude and longitude) with accuracy up to 100 m;
- powerful transmitter, in stand-by mode, capable of sending a steady and clear distress signal within 0.5 sec without the need of a signal accumulation at a receiving end.

Thus the invention provides for the engagement of GS ES which orbits are fixed at the altitude of some $R_2$=40,000 km, i.e. eleven-fold (11 times) exceeding the distance of reach ($R_1$=3,500 km) of the LO ES within the current COSPAS-SARSAT system. This is why it is, generally, presumed that the output power ($P_2$) of a new type EPIRB should substantially exceed the current output power ($P_1$=5 W) of the operational INMARSAT EPIRB, which might result in drastic increase of the overall dimensions and costs of the EPIRB. One can easily demonstrate that the reasons for such presumption are unsupported. In fact, $$P_2=P_1 \cdot G_1/G_2 \cdot (R_2/R_1)^2, \quad (1)$$

where $G_1$=2 (3 Db)—antenna gain of LO ES;

G2=50 (17 dB)—antenna gain of GS ES, thus the output power ($P_2$) is equal to;

$$P2=5 \cdot 2/50 \cdot (40{,}000/3{,}500)^2=20 \text{ W} \quad (2)$$

As for the overall dimensions and costs of the new powerful EPIRB, the tentative estimations give the figures very close to that of the existing EPIRB within the current COSPAS-SARSAT system based on the LO ES. Thus, the next upgrade of COSPAS-SARSAT system, if based on the present invention, would be, generally, limited to manufacturing and installation, on board the aircraft, of EPIRB as simple and cheap as before. Nevertheless, such upgrade would offer the drastic increase of the system efficiency:

the comprehensive solution of yet unsolved, in principle, problem dealing with the establishment of an air catastrophe site;

reduction of time span ($10^3$ to $10^4$ folds) and increase of accuracy (20 to 30 folds) of establishing the sites of aircraft non-destructive emergency landings.

Thus, in accordance with the claimed invention, for the comprehensive solution of the emergency warning problem it is necessary on equip every aircraft with a new type EPIRB. The problem arises concerning the feasibility of equipping many thousand aircraft of a world park with EPIRB constantly "live" during each flight, taking into account the fact that the emergency cases, for which EPIRB is designed, are extremely rare. The negative answer to this question becomes obvious, especially, if one recalls that at standard conditions of operation (normal flight) the functional readiness of EPIRB is rarely inspected. Therefore, probability of its reliable operation in extreme conditions can not be high. The invention provides for a combined system which deals with the said problem at no extra costs and in a natural way. For this purpose it is proposed to use same EPIRB for transmission of the alarm signals, and signals for monitoring. In such arrangement the constantly active status of EPIRB in the "Monitoring" mode guarantees its functional readiness to be instantly switched to the "Emergency" mode. The selection of contiguous (neighboring) narrow bandwidths of signal transmission within common frequency band (400 MHz) for both modes ("Monitoring" and "Emergency") allows to use in EPIRB the unified broadband transmitter. Thus, in the combined system it is possible to install a single EPIRB, moreover, it is possible to use for retransmission of signals a single GS ES located within the limits of visibility (reach) (see. FIG. 1) and various DCC linked with this GS ES, this arrangement almost twofold reduces costs of the system implementation and substantially increases its reliability. To ensure system operation in a polar zone it is necessary to select such working frequencies, which allow, due to the phenomenon of diffraction ("curving" the globe), to overcome drawbacks intrinsic to INMARSAT-E system, where the rather high frequency (1,500 MHz) is used. In the proposed solution, for operations in both modes—"Monitoring" and "Emergency"—the neighboring frequencies in a common band are selected, the band consists of the frequencies relatively low for satellite systems—400 MHz, at such band the effect of diffraction is clearly pronounced.

DETAILED DESCRIPTION OF THE INVENTION

Figure 1:
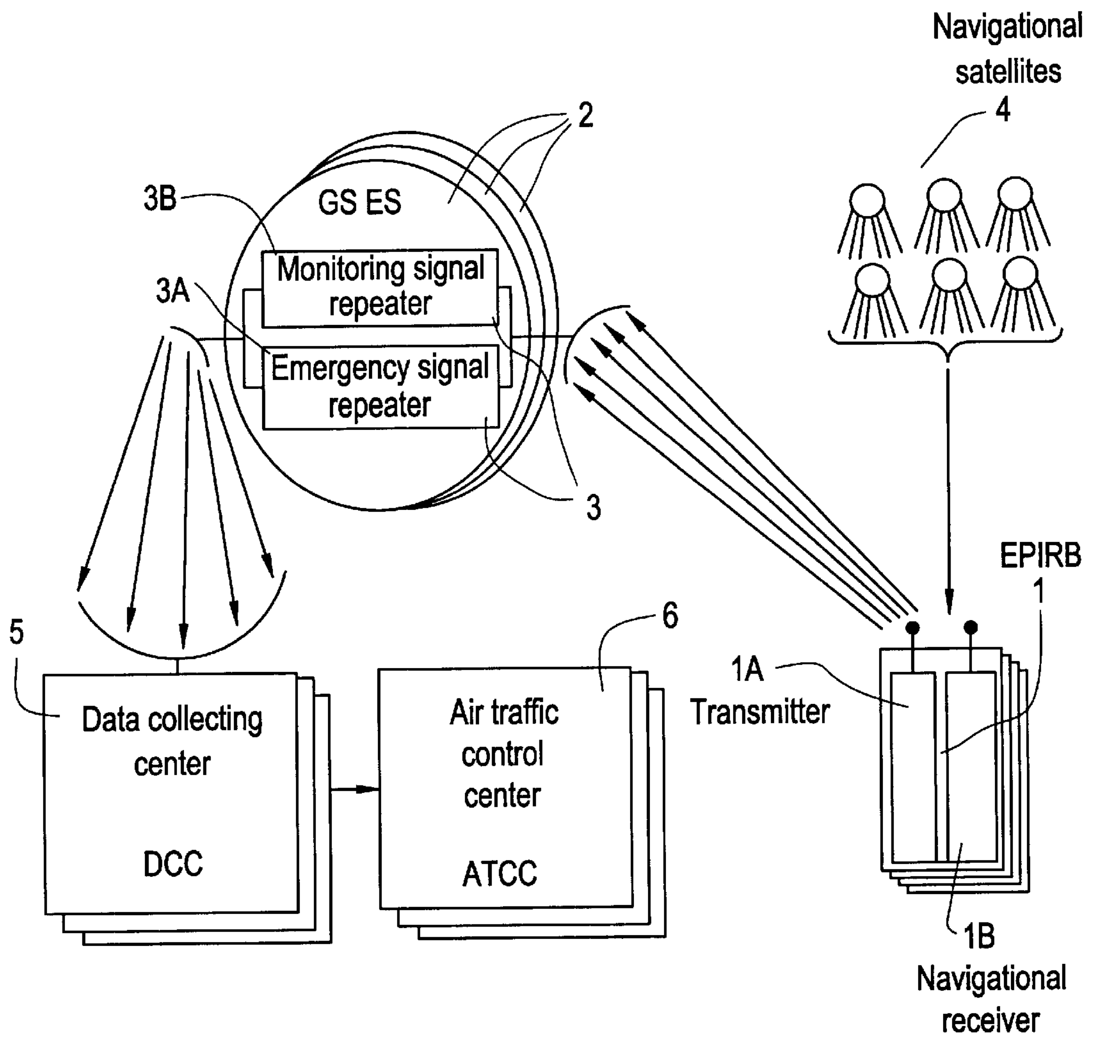
FIG. 1 is a diagram illustrating a system for global automatic monitoring of transport vehicles according to the present invention.

A preferred variant of practical realization of the system of global automatic monitoring of the TV at normal ("Monitoring" mode) and extreme conditions ("Emergency" mode ") is presented on FIG. 1, where:

1—is EPIRB (1) installed on board aircraft and constantly operating during the flight, it includes:

transmitter (1A), working in both modes in a common frequency band (400 MHz) for transmission of "Emergency" signals: within the frequency band of (406.1–406.0) MHz=0.1 MHz=100 KHz; currently assigned for the operation of the international modernized (by use of GS ES) emergency satellite system COSPAS-SARSAT, and signals for "Monitoring"—in the neighboring frequency band of he same width—100 KHz, combined navigational receiver (1B) of signals transmitted by satellite navigational systems GPS and/or GLONASS;

2—are five GS ES of the operational international satellite meteorological system, ensuring global coverage, or GS ES of other satellite systems, on which can accommodate onboard repeaters 3A and 3B;

3—are repeaters of "Emergency" signals (3A) and "Monitoring" signals (3B);

4—are navigational ES belonging to GPS and GLONASS systems;

5—are five ground (land) DCC, linked to corresponding GS ES;

6—are air traffic control centers (ATCC), linked to corresponding DCC.

Figure 2A:
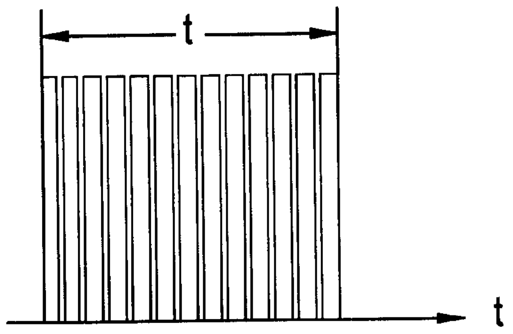
FIGS. 2(1) and 2(2) are signal diagrams illustrating data transfer characteristics according to the present invention.
Figure 2B:
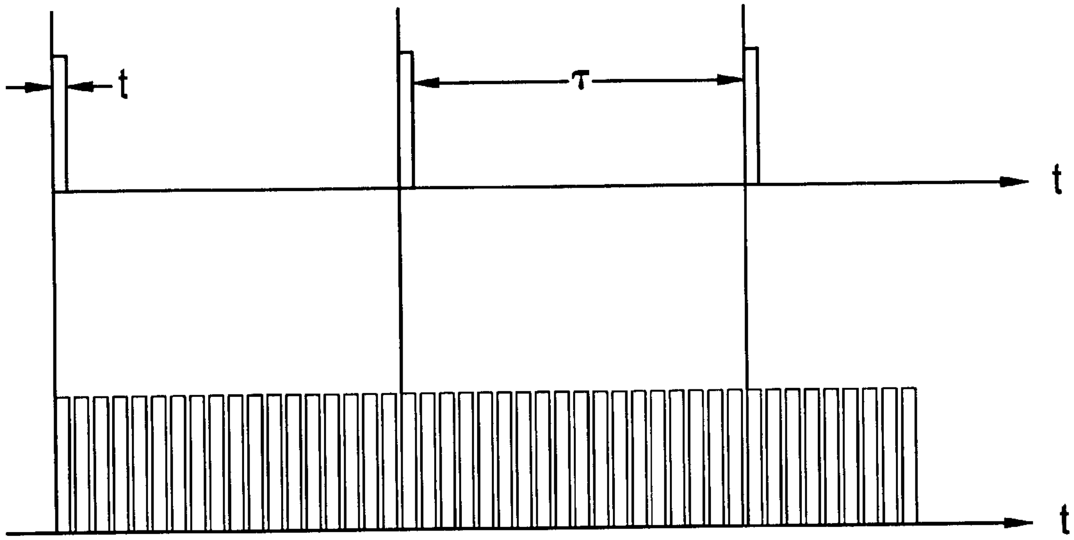

FIG. 2 demonstrates the data transfer characteristics in the "Monitoring" mode, where:

1—is signal package (batch);

2—is diagram of packages sequence at a synchronous method of transmission.

The claimed system is implemented as follows:

On board aircraft the EPIRB 1 (see FIG. 1) is installed, which includes:

receiver 1B (FIG. 1) of signals transmitted by satellite navigational systems GPS and/or GLONASS 4 (see FIG. 1), that allows to, continuously, receive the discrete information on the current coordinates of the aircraft in real time mode with accuracy up to 100 meters. In most cases such receiver is the aircraft standard onboard equipment, however, in case of its absence, it should be incorporated in EPIRB (alternatively);

transmitter 1A (see FIG. 1), which retransmits the signals coming in from the navigational receiver 1B (see FIG. 1), the transmitter is constant operational ("live") in a transmission mode sending the information on the current coordinates ("Monitoring") through all phases of flight, providing that, for maintenance of the steady communication with GS ES, the output power of the combined transmitter of EPIRB should be increased (over 20 W).

On the narrow bandwidth, assigned to ATCC (up to 100 KHz in 400 MHz band), the information regarding the current coordinates is transmitted with a standard rate of 400 bit/sec by packages lasting τ=0.52 sec. (see FIG. 2) to the repeater 3B (see FIG. 1) of a GS ES belonging to the international meteorological system or to GS ES of an alternative system. The batch signals, amplified by repeater 3B, are received by DCC linked with corresponding GS ES 5 (see FIG. 1), recorded and transmitted to various ATCC 6 (see FIG. 1). In case of an aircraft emergency, the special onboard analyzer instantly switches the EPIRB to "Emergency" mode. Thus, according to the claimed invention, both modes use the neighboring narrow bandwidths within the selected frequency band (400 MHz), unified transmission rate (400 bit/sec), a transmitter with increased output power (20 W or more), standard layout of data packages having equal duration (τ=0.52 sec). The unified requirements to electrical parameters of the system predetermined its capability to implement both modes with a single set of equipment (EPIRB, GS ES, DCC) of double application. Despite of short duration of the data package (τ=0,52 sec), each of them (see. FIG. 2) contains five current values of the aircraft flight parameters: latitude and longitude with accuracy of up to 100 m., altitude, course and velocity of flight, as well as the data from sensors, indicating the technical parameters and identification number of the aircraft. These parameters are relayed to the input of the transmitter from a navigational (GPS/GLONASS) receiver incorporated in the EPIRB or included in the standard onboard equipment.

It should be noted that in case of a catastrophe ("Emergency" mode), the transmission of data packages has, practically, the continuous nature (T=0.5 sec), whereas the intervals in the "Monitoring " mode are longer (T>10 sec). FIG. 2 demonstrates that in the "Monitoring", mode, i.e. at standard conditions of operation, the functionality of EPIRB is constantly inspected (does the "Monitoring" signal go through or not) at short intervals, thus providing assurance of the EPIRB being ready to work at the emergency situations. Therefore, the EPIRB executing two functions within the combined system, guarantees the substantial increase of the reliability standard, i. e. it will surly operate in emergency cases.

As mentioned above, the switching of EPIRB on the emergency frequency band (406.0–406.1 MHz) in cases of air accidents is effected by an aircraft onboard analyzer, which design is highly sophisticated. In the combined system the problem in question can be solved without an onboard analyzer—by means of extrapolation of sequential data on the aircraft coordinates (position) received in the "Monitoring" mode before, and up to, a signal loss (FIG. 2). The above also leads to the presumption, that the combined system can deal with a problem of detecting the site of an air accident of any, even shortest, duration, including an aircraft explosion.

As to the "Monitoring" mode, the regular input of the data about the aircraft current coordinates to the ATCC computers offers a possibility of a basically new approach to the problem of air flight safety. The instantaneous processing of the currently incoming data from all aircraft flying within the coverage of the ATCC, would allow to forecast development of a situation and to warn pilots (through usual communication channels) of a possible collision with air or land objects thus preventing such collisions.

The claimed system provides for collection of data coming from aircraft to ATCC through space directly, i. e. without participation of the Earth. Thus, there is no need in construction and operation of complicated and costly land complexes of tracking, radars, relay radio stations and other infrastructure associated with ATCC.

The main difference of the approach, proposed by this invention, to the solution of the said problem consists in that it is aimed at the solution of both components of the identified problem of air safety within the framework of a single combined system of double application, inclusive single set of equipment. Due to such approach, the costs of construction and operation of the combined system are much lower than that of two independent systems. At the same time, as it follows from the comparisons presented below, the efficiency of the solution based on the combined air safety system, comprising "Emergency" and "Monitoring" modes, will be considerably higher than at two independent systems taken together.

It is to be noted that the number of aircraft which may happen to fly within the coverage zone of the same GS ES, can be counted in many hundreds, and the "Monitoring" mode component must be able to accommodate all of them without any mutual interference. At random (asynchronous) transmission of data packages coming from an aircraft EPIRB on any frequency-separated channel (FSC) the probability of their mutual "annihilation" (mutual suppression) is high. To eliminate the interference and, thus, to ensure the maximum channel capacity on each radio channel (FSC) assigned for "Monitoring", the invention, as it follows from FIG. 2, provides for the synchronous (organized) transmission, at which the individual packages of signals from each aircraft EPIRB follow one another with a minimum intervals (gaps). According to the present invention the required synchronization is provided with the help of global time signals (accuracy up to 5 msec), which are generally incorporated in signals of GPS/GLONASS satellite systems, this signals are received by the navigational receivers of EPIRB (or aircraft receivers). FIG.2 shows, that the maximum number (n) of aircraft EPIRB transmitting within one channel (a channel capacity is evaluated as $n=k\cdot T/\tau$). So, for example, with the space factor k=0.8, T=20 sec, τ=0,52 sec the result is n=30.

To ensure the global coverage it would be necessary to engage 5 GS ES therefore, the simultaneous communications with up to 600 aircraft in each of 5 zones covered by GS ES (altogether—3,000 aircraft) one needs only 20 radio channels. If one takes into account, that the proposed system uses the frequency separation of channels (FSC) with the grid step Δf=2 KHz, the implementation of the global "Monitoring" will require an insignificant bandwidth of some 40 KHz. Taking into account other types of TV and necessary reserve (redundancy) for smooth operation of the system, the frequency bandwidth will not exceed 100 KHz.

For comparison, one should recall, that the bandwidth currently assigned to the international meteorological satellite system (5 GS ES) is determined as Δf=(403–401) MHz=2 MHz, which is 50 times more than frequency bandwidth required for the implementation of global "Monitoring".

What is claimed is:

1. A system for automatic global monitoring of transport vehicles under normal and extreme conditions, the system comprising a plurality of transport vehicles each comprising a radio beacon device for transmitting signals to ground data collecting centers via geostationary satellites, the radio beacon device being constantly operational during the vehicle's movement and stopovers, wherein under the extreme conditions, the radio beacon device continuously transmits emergency data batches with less than one second intervals in a narrow bandwidth of 400 MHz range, dedicated to space retransmission of distress signals, and, under normal conditions, the radio beacon device transmits monitoring data batches in a neighboring frequency band with intervals between batches greater than 10 seconds, wherein the emergency and monitoring data batches are retransmitted via the geostationary satellites to the associated ground data collecting centers.

2. The system according to claim 1, wherein under normal conditions, the monitoring data batches are transmitted from the radio beacon devices installed in various kinds of transport vehicles operating in the same radio channel in synchronous mode with intervals up to 0.1 seconds, and synchronization is based on global time notches up to 0.5 milliseconds detected by the radio beacon from navigational signals of GPS or GLONASS satellite systems.

3. A radio beacon device installed in a transport vehicle for monitoring the transport vehicle under normal and extreme conditions via a global monitoring system including a plurality of ground data collecting centers and a plurality of geostationary satellites, the radio beacon device comprising a transmitter for transmitting signals to the ground data collecting centers via geostationary satellites, the radio beacon device being constantly operational during the transport vehicle's movement and stopovers, wherein under the extreme conditions, the transmitter continuously transmits emergency data batches with less than one second intervals in a narrow bandwidth of 400 MHz range, dedicated to space retransmission of distress signals, and, under normal conditions, the transmitter transmits monitoring data batches in a neighboring frequency band with intervals between batches greater than 10 seconds.

4. The radio beacon device according to claim 3, further comprising a navigational receiver for receiving navigational signals from at least one of a GPS satellite system and a GLONASS satellite system, wherein under normal conditions, the transmitter transmits the monitoring data batches in a synchronous mode with intervals up to 0.1 seconds, and synchronization is based on global time notches of the navigational signals from at least one of the GPS and GLONASS satellite systems.

5. The radio beacon device according to claim 3, wherein the emergency and monitoring data batches include data indicating a location of the transport vehicle and identifying the transport vehicle.

* * * * *